United States Patent [19]

Kikuchi et al.

[11] 4,189,414

[45] Feb. 19, 1980

[54] COATING COMPOSITIONS FOR ARCHITECTURAL USE

[75] Inventors: Kiyoshi Kikuchi, Hiratsuka; Takeo Okano, Zama; Yukio Terakawa, Tokyo; Akira Nishihara, Tokyo; Koji Kono, Tokyo, all of Japan

[73] Assignee: Kowa Chemical Industry Ltd., Japan

[21] Appl. No.: 951,033

[22] Filed: Oct. 13, 1978

[30] Foreign Application Priority Data

Oct. 18, 1977 [JP] Japan ................................ 52-124832

[51] Int. Cl.$^2$ .......................... B05D 3/02; C08L 61/20
[52] U.S. Cl. ....................... 260/29.4 R; 260/29.2 EP; 260/37 EP; 427/385 C; 427/386; 428/413; 428/417; 428/524
[58] Field of Search ............... 427/372 A, 372 B, 386, 427/385 C; 260/29.1 SB, 29.2 EP, 37 EP, 29.4 R; 428/413, 417, 524

[56] References Cited

U.S. PATENT DOCUMENTS

| | | | |
|---|---|---|---|
| 3,242,116 | 3/1966 | Becker et al. | 260/29.2 EP |
| 3,464,854 | 9/1969 | Bolger et al. | 260/29.2 X |
| 3,575,785 | 4/1971 | McManimic et al. | 427/385 X |
| 3,915,917 | 10/1975 | Weiant et al. | 260/29.2 X |

Primary Examiner—Michael R. Lusignan
Attorney, Agent, or Firm—McGlew and Tuttle

[57] ABSTRACT

Novel coating compositions for architectural use are provided, which include a quaternary ammonium silicate having a silica content of 10 to 60% by weight and a liquid epoxide resin, besides the conventional ingredients, such as pigments, fillers, aggregates and water, and which are particularly capable of producing films having excellent adherency to mortar or concrete surfaces. If a stabilized silica sol is added to the compositions, films produced therefrom have much improved resistance to water at low temperatures as well as freeze-thaw stability.

12 Claims, No Drawings

COATING COMPOSITIONS FOR ARCHITECTURAL USE

BACKGROUND OF THE INVENTION

This invention relates to coating compositions for architectural use, specifically adapted for applications to concrete or mortar surfaces, and more particularly to coating material containing a quaternary ammonium silicate as the principal component and having good adhesion to the substrate even at low temperatures.

In the prior art, quaternary ammonium silicates themselves have been used as a wetting agent or a coating material, and it is known that the films formed by drying a solution containing such quaternary ammonium silicate are insoluble in hot as well as cold water, and have excellent resistance to heat and fire. However, when a coating composition is prepared by adding the quaternary ammonium silicate as a binder and the composition, thus prepared, is applied to the substrate, exterior or interior, consisting of concrete or mortar, the resulting solid coatings are critically defective in water-resistance, strength and other properties.

The present invention is based on the discovery, resulting from extensive studies on the above-described drawbacks, that the use of a binder consisting of a quaternary ammonium silicate and a certain amount of an epoxide resin brings about a coating which has excellent adhesion when immersed in water, and also that further addition of a silica sol as the binder contributes to strength, which is obtained very quickly for the coating, even at lower temperatures.

In explanation, the above studies were directed to, the structure which was produced on the surface of the silica that was formed by the quaternary ammonium silicate, its capability of forming hydrogen bonds and its association ability as well as to the adsorbability of silanol groups contained in the silica. The study was also directed to the structure of the network of the siloxane bonding which was produced between the surface and inner layers of the coating formed through gelling when a silica sol was added as the binder. It was found that the network structure had remarked differences when the coating was as thick as 2 mm or more. It was then concluded that coatings having sufficient toughness or strength could not be obtained by mere mechanical bonding force, but only by the formation of a complex with a highly reactive and bonding epoxide resin.

The coating compositions of the present invention are distinguished by their capability of producing coatings having high resistance to repeated changes of temperatures and, accordingly, suitable particularly for application to houses and buildings, interior or exterior, in cold areas. The coatings thus produced can well stand severe climatic changes, involving repetition of freezing and thawing.

SUMMARY OF THE INVENTION

According to the present invention, there are provided firstly, a coating composition for architectural use which is particularly capable of producing films having excellent adherency to a substrate and secondly a separate coating composition which is particularly capable of producing films having sufficient strength, even at low temperatures, and high resistance to water and changes of temperatures. The first coating composition comprises (a) a quaternary ammonium silicate having a silica content of from 10 to 60% by weight, (b) a liquid epoxide resin, (c) pigments and fillers and (d) water, the amount of component (b) being in the range of from 2 to 30 parts by weight as calculated on the basis of a solid content of 50% by weight per 100 parts by weight of component (a) as calculated on the basis of a silica content of 30% by weight.

The second embodiment for the coating composition of the present invention comprises (a) a quaternary ammonium silicate having a silica content of 10 to 60% by weight, (b) a liquid epoxide resin, (c) a silica sol, (d) pigments and fillers and (e) water, the amount of component (b) being in the range of from 2 to 30 parts by weight as calculated on the basis of a solid content of 50% by weight and that of component (c) being in the range of from 10 to 100 parts by weight as calculated on the basis of a silica content of 30% by weight, both per 100 parts by weight of component (a) as calculated on the basis of a silica content of 30% by weight.

For the purpose of the above mentioned second embodiment, the silica sol as component (c) is one which is stabilized by adding at least one dihydric alcohol having 3 or more carbon atoms and a water-soluble melamine resin.

Further in accordance with the present invention, the addition of a liquid epoxide resin in combination with a quaternary ammonium silicate as binder serves to enhance the adhesion and toughness of the resulting coatings. The addition of a stable silica sol brings about effects to quicken the strengthening of the coatings at low temperatures. On the other hand, the use of these components results in preventing the water glass-type binder from milking and imparting good water-resistance to the resulting coatings, and also in improving the strength of coatings obtained from the silica sol binder, especially in water. Furthermore, the coatings produced by the coating compositions of the present invention comprising the above-mentioned three components are highly resistant to fire as inorganic coating-forming material and, at the same time, sufficiently tough and strong as organic coating-forming material.

DETAILED DESCRIPTION OF THE PREFERRED EMBODIMENTS

The quaternary ammonium silicates useful in the coating composition of the present invention have the general formula

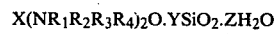

$$X(NR_1R_2R_3R_4)_2O \cdot YSiO_2 \cdot ZH_2O$$

where X is 1, Y is a number of from 0.5 to 20, Z is a number of from 0 to 99, N is a nitrogen atom, and $R_1$, $R_2$, $R_3$ and $R_4$ each are a hydrogen atom, an alkyl group, or an alkoxy group, both groups containing from 1 to 20 carbon atoms.

Preferred examples of the quaternary ammonium silicates are tetraethanol ammonium silicate, tetraethyl ammonium silicate, tetramethyl ammonium silicate, diethyldimethanol ammonium silicate, dimethyldiethanol ammonium silicate, monomethyltripropanol ammonium silicate, dimethylpropanol ammonium silicate, and monoethylpropanol ammonium silicate.

The quaternary ammonium silicates should have a silica content of from 10 to 60% by weight, since a sufficient bonding force and a good coating performance cannot be obtained when it is less than 10%, while satisfactory stability of the resulting coating composition cannot be obtained when it exceeds 60%.

The epoxide resins useful in the coating composition of the invention are organic compounds which have at least one epoxy end group and which are liquid at room temperature. Operable epoxide resins include the groups of bisphenol A epichlorohydrin compounds, glycidyl phthalate compounds, and alicyclic epoxide resins. It is preferred that they have an epoxy equivalent of from 150 to 1200, since no satisfactory performance can be obtained when it is less than 150, while their dispersion in water can hardly be obtained when it exceeds 1200. Some of the commercially available epoxide resins are as follows. Epikote 812, Epikote 815, Epikote 826, Epikote 1004, and Epikote 1040 manufactured by Shell Chemicals; DER 331 and DER 664 manufactured by Dow Chemical Company; and Epikron 800 and Epikron 850 manufactured by Dainippon Ink Chemical Industry Co.

A single epoxide resin or combination of two or more epoxides may be used. The amount of the epoxide resin used ranges from 2 to 30 parts by weight per 100 parts by weight of the quaternary ammonium silicate. This is because amounts less than 2 parts cause an insufficient bonding force to the resulting composition, while amounts in excess of 30 parts tend to lower the fire resistance of the finished coatings.

Curing agents operable in the coating compositions of the present invention are, for example, imidazole ring-containing aliphatic polyamines, aromatic polyamines, alicyclic polyamines, polyamidoamines, tertiary amines, fatty acids and their anhydrides. Especially, modified aliphatic polyamines having a low toxicity are preferred.

The remarkably stable silica sols useful in the coating compositions of the present invention have an $SiO_2/M_2O$ molar ratio (in which M is a monovalent alkali metal atom) of 20 to 400:1, and contain water or a hydrophilic organic solvent as the dispersion medium, the concentration of $SiO_2$ being preferably within the range of 10 to 60% by weight. When the molar ratio is less than 20:1, the silica sol has properties almost similar to those of water glass, and the coatings formed tend to cause a milking phenomenon and have poor water resistance.

The silica sol having a solid content of 30% by weight useful in the coating compositions of the present invention should be added in an amount of from 10 to 100 parts by weight per 100 parts by weight of the quaternary ammonium silicate having a similar silica content. If the amount used is less than 10 parts, the coatings formed have an insufficient binding force, while if it is more than 100 parts, the water resistance of the coatings formed is impaired.

The dihydric alcohols having 3 or more carbon atoms which are employable for the purpose of stabilizing the silica sol are exemplified by propylene glycol, trimethylene glycol and triethylene glycol. The water-soluble melamine resins which are used for the same purpose in combination with the dihydric alcohols are, preferably, stable water-soluble methyl-etherified melamine-formaldehyde precondensates prepared by etherifying a high methylol melamine with methanol under weak acidic conditions. The amount of the water-soluble melamine resin is more than 2 parts by weight, preferably ranging from 2 to 10 parts by weight, and that of the dihydric alcohol is 5 or more parts by weight both per 100 parts by weight of the silica sol having a 30% by weight silica content. Further, illustrative of the pigments employable in formulating the coating compositions of the present invention, but in no way limitative thereof, are titanium dioxide of the rutile or anatase type and other commercially available inorganic and organic pigments which are, preferably, adaptable for the so-called water-based paints. Illustrative of the fillers including aggregates, also not limitatively, are calcium carbonate, powder of siliceous stone, white marble, silica sand, and the like.

The coating compositions of the present invention can be prepared by the steps of adding to the quaternary ammonium silicate the stable silica sol, if necessary, and the fillers, water and suitable additives, followed by agitation by means of a high-speed mixer to form a homogeneous mixture, then adding the epoxide resin and a thickening agent, followed by continued agitation till the epoxide resin and the thickening agent become completely dispersed in the homogeneous mixture, and finally adding to the resulting dispersion the curing agent, followed by milling. The application to surfaces of the coating compositions thus prepared may be made by ordinary methods, such as, spraying, brushing and roller coating.

The coating compositions according to the present invention have an excellent coating workability and are most suitable for full coat finishes, thin coat finishes and sand wall-like finishes. The coating compositions have excellent can-stability at low temperatures. The cured coatings or films formed are free from crazing and insufficient adhesion, which are defects encountered in the conventional inorganic coating material, and, on the other hand, improved in hardening at low temperature, surface hardness and fire-resistance, compared to the conventional organic coating material. Further the cured films have more improved water-resistance and freeze-thaw stability as well as toughness.

The present invention is illustrated but not limited by the following examples. In the examples parts and percentages are by weight.

EXAMPLE 1

Into a beaker containing 100 g of tetraethanol ammonium silicate having a 30% $SiO_2$ content were added powdery siliceous stone, powdery calcium carbonate and water. The mixture was stirred by a high-speed mixer to form homogeneity. To the homogeneous mixture was added a liquid addition-condensate epoxide resin having a 50% solid content, and epoxy equivalent of 175 (trade name: Epikote 815 of Shell Chemicals), followed by agitation for several minutes. A curing agent (trade name: Tomite 235 of Fuji Chemical Co.) was added to the resulting mixture after having been allowed to stand, followed by milling. The composition thus obtained was applied to the surface of a mortar board, 6×6×2 cm, in an amount of 2.0 kg per square meter of coating, using a spray gun. The composition is designated as "Present Invention No. 1," and the amount of each ingredient used is indicated in Table I.

In comparison thereto, a similar procedure was taken but the charge of tetraethanol ammonium silicate was omitted while the other ingredients were used in certain amounts as indicated in Table I. This comparative composition is designated as "Control No. 1."

The films formed on the surface of each mortar board sample piece obtained above were determined for adhesion in accordance with Japanese Industrial Standard 6910 with the results as shown in Table I. From the results, it is evident that the absence of the quaternary ammonium silicate and the presence of the epoxide resin instead as the binder are indicative of inferior adhesion.

The above-mentioned Table I will, for the sake of simplicity, be given in combination with the description of the following Example 2.

EXAMPLE 2

A stable silica sol which was useful in the composition of the present invention was prepared by mixing 100 parts of a silica sol having a 30% $SiO_2$ content and a molar ratio $SiO_2/Na_2O$ of 100:1, 10 parts of propylene glycol and 2 parts of a water-soluble melamine resin, followed by uniform agitation.

The same procedure as in Example 1 was repeated with or without the stable silica sol prepared above and other ingredients as indicated in Table I under headings "Present Invention No. 2" and "Control No. 2," and similar test samples of mortar boards were obtained. The adhesion test was carried out with the samples, and the results are set forth in Table I. It is evident from the results that the exclusion of the stable silica sol and the epoxide resin is indicative of far inferior adhesion.

Table I

|  | Coating | | Composition | |
|---|---|---|---|---|
|  | Present Invention No. 1 | Control No. 1 | Present Invention No. 2 | Control No. 2 |
| Ingredients: | | | | |
| Tetraethanol ammonium silicate, g | 100 | 0 | 100 | 100 |
| Epoxide resin, Epikote 815, g | 24 | 100 | 10 | 0 |
| Curing agent, Tomite 235, g | 8 | 30 | 3 | 0 |
| Stable silica sol, g | 0 | 0 | 100 | 0 |
| Siliceous stone, g | 270 | 270 | 450 | 200 |
| Calcium carbonate, g | 150 | 150 | 200 | 100 |
| Water, g | 60 | 84 | 100 | 100 |
| Ratio by weight of binder (solid content) to filler | 1/10 | 1/8.4 | 1/10 | 1/10 |
| Adhesion, kg/cm$^2$: | | | | |
| (a) In standard state | 15.3 | 11.5 | 20.0 | 11.5 |
| (b) After immersion in water | 9.5 | 6.5 | 14.2 | 6.5 |
| (c) After repeated warming & cooling | 7.0 | 4.7 | 13.0 | 4.5 |
| (d) After curing at −50° C. over 7-day period after coating | 8.1 | 4.0 | 11.8 | 4.2 |

EXAMPLE 3

Each test sample obtained in Examples 1 and 2, i.e., Present Invention No. 1, Control No. 1, Present Invention No. 2, or Control 2, was determined for freeze-thaw stability by dipping the sample piece into water with its coated surface exposed above the water level, the water being initially cooled as low as −20° C., then keeping same in situ over a period of 8 hours during which the temperature of the water was gradually raised to 30° C., and thereafter for additional 8 hours at this elevated temperature, to form one heat-cool cycle. Such freeze-thaw test was then carried out by 1, 20, 30, and 50 cycles of operation to observe the change of the condition of the coated surface, with the results as set forth in Table II. It is evident from the results that the samples of Present Invention No. 1 and No. 2 exhibited superior stability to Control samples.

Table II

|  | Coating | | Composition | |
|---|---|---|---|---|
| Freeze-thaw statility: | Present Invention No. 1 | Control No. 1 | Present Invention No. 2 | Control No. 2 |
| (a) One cycle | * | * | * | **** |
| (b) 20 cycles | * | *** | * | — |
| (c) 30 cycles | ** | — | * | — |
| (d) 50 cycles | ** | — | * | — |

Note:
The mark * indicates no change exhibited.
The mark ** indicates crazing occurring.
The mark *** indicates blistering occurring.
The mark **** indicates peeling occurring.

EXAMPLE 4

Coating compositions "Present Invention No. 3" and "Present Invention No. 4" were prepared with the same main ingredients as used for the preparation of composition Present Invention No. 2 in Example 2 and certain other auxiliary additives in the varied amounts as indicated in Table III.

In composition Present Invention No. 3 thus prepared, a porous roller 7 inches wide (trade name: "Mastic Coat Roller" manufactured by Otsuka Brush Manufacturing Co.), was immersed for a while. Then using this roller impregnated with the composition, and by movements in up-and-down and right-and-left directions, a mortar surface was coated in an amount of 2.5 kg per square meter of coating. Thereafter, the coated surface was levelled by the roller in which a small amount of the composition was contained, to obtain a coating having an average thickness of 2 mm and ripple-like finishes.

On the other hand, composition Present Invention No. 4 prepared above was applied to the surface of a precast concrete board in an amount of 1.5 kg per square meter of coating by means of spray guns having with a nozzle 7–8 mm in diameter under 4–5 kg/cm$^2$ pressure. The resulting coatings had beautiful, rugged finishes.

Each coating obtained from the above two compositions was subjected to the adhension test, and it was found that the results were the same as obtained in composition Present Invention No. 2.

Table III

|  | Coating Composition Present Invention | |
|---|---|---|
|  | No. 3 | No. 4 |
| Tetraethanol ammonium silicate, g | 100 | 100 |
| Epoxide resin, Epikote 815, g | 10 | 10 |
| Curing agent, Tomite 235, g | 3 | 3 |
| Stable silica sol, g | 100 | 100 |
| Powdered siliceous stone, g | 250 | 250 |
| Finely powdered calcium carbonate, g | 450 | 250 |
| Coarsely powdered calcium carbonate, g | 0 | 200 |
| Thickening agent | 1 | 0.7 |
| Water-proofing agent | 5 | 5 |
| Water | 130 | 150 |

What is claimed is:

1. A coating composition for architectural use comprising (a) a quaternary ammonium silicate having a silica content of from 10 to 60% by weight, (b) a liquid epoxide resin, (c) pigments and fillers and (d) water, the amount of component (b) being in the range of from 2 to 30 parts by weight as calculated on the basis of a solid content of 50% by weight per 100 parts by weight of component (a) as calculated on the basis of a silica content of 30% by weight.

2. A coating composition for architectural use comprising (a) a quaternary ammonium silicate having a silica content of 10 to 60% by weight, (b) a liquid epoxide resin, (c) a silica sol, (d) pigments and fillers and (e) water, the amount of component (b) being in the range of from 2 to 30 parts by weight as calculated on the basis of a solid content of 50% by weight and that of component (c) being in the range of from 10 to 100 parts by weight as calculated on the basis of a silica content of 30% by weight, both per 100 parts by weight of component (a) as calculated on the basis of a silica content of 30% by weight.

3. The coating composition as claimed in claim 2 wherein the silica sol is stabilized by adding at least one dihydric alcohol having 3 or more carbon atoms and a water-soluble melamine resin.

4. A coating composition, according to claim 1, wherein said quaternary ammonium silicate has the general formula $X(NR_1R_2R_3R_4)_2O \cdot YSiO_2 \cdot ZH_2O$ wherein X is 1, Y is the number from 0.5 to 20, Z is the number from 0 to 99, N is a nitrogen atom and $R_1$ and $R_2$, $R_3$ and $R_4$ each are a hydrogen atom, an alkyl group, or an alkoxy group, with the alkyl group and alkoxy group containing from 1 to 20 carbon atoms.

5. A coating composition according to claim 4, wherein said quaternary ammonium silicate is chosen from the group consisting of: tetraethanol ammonium silicate, tetraethyl ammonium silicate, tetramethyl ammonium silicate, diethyldimethanol ammonium silicate, dimethyldiethanol ammonium silicate, monomethyltripropanol ammonium silicate, dimethylpropanol ammonium silicate, and monoethylpropanol ammonium silicate.

6. A coating composition according to claim 1, wherein said epoxy resin has at least one epoxy end group and is chosen from the group consisting of bisphonol A epichlorohydrin compounds, glycidyl phthalate compounds, and alicyclic epoxide resins.

7. A coating according to claim 1, further including a curing agent.

8. A coating according to claim 7, wherein said curing agent is chosen from the group consisting of imidazole ring-containing aliphatic polyamines, aromatic polyamines, alicyclic polyamines, polyamidoamines, tertiary amines, fatty acids and their anhydrides, and modified aliphatic polyamines.

9. A coating composition according to claim 2, wherein said silica sol has a molar ratio of 20 to 400:1, and contains water or a hydrophilic organic solvent as a dispersion medium.

10. A coating composition according to claim 1, wherein said pigments are chosen from the group consisting of rutile titanium dioxide, anatase titanium dioxide, inorganic and organic pigments which are adaptable for forming a water-based paint.

11. A coating composition according to claim 1, wherein said fillers are chosen from the group consisting of calcium carbonate, powder of siliceous stones, white marble and silica sand.

12. A method of forming a coating composition according to claim 1 comprising the steps of adding a quaternary ammonium silicate to stable silica sol, fillers, and water to form a mixture, exposing the mixture to high-speed mixing to form a homogeneous mixture, adding an epoxide resin and a thickening agent to said homogeneous mixture to form a mixture with additives, agitating said mixture with additives until the epoxide resin and the thickening agent become completely dispersed in the mixture with additives, and adding a curing agent to the resulting mixture with additives.

* * * * *